Aug. 29, 1944.   E. H. EAST   2,356,982
FLOAT VALVE
Filed March 8, 1943
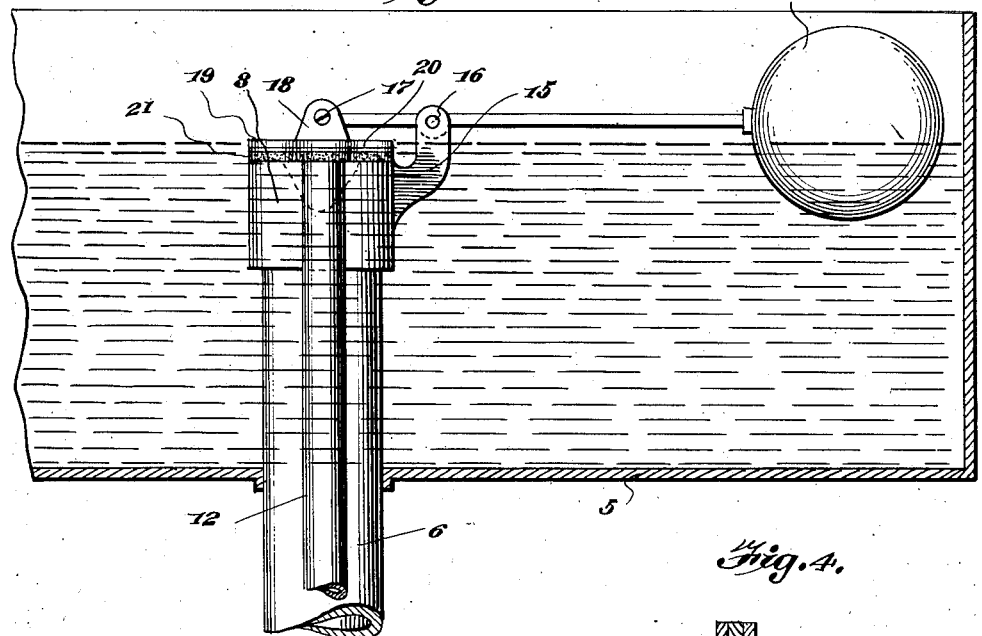
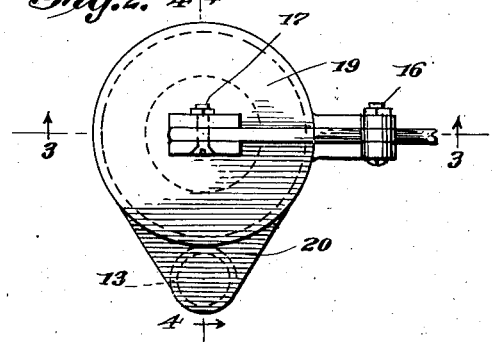
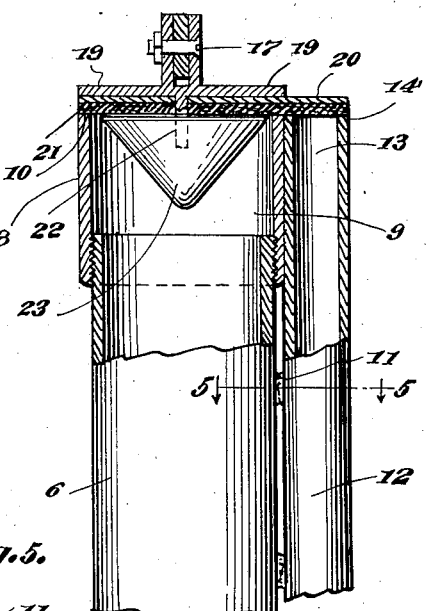
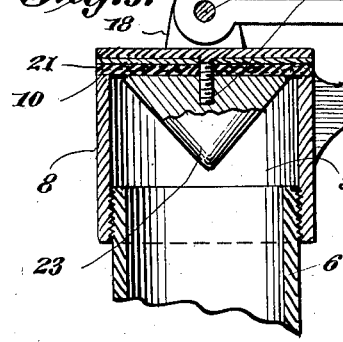
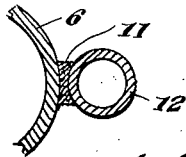
Inventor
E. H. EAST
By Lacey & Lacey,
Attorneys Patented Aug. 29, 1944

2,356,982

UNITED STATES PATENT OFFICE 2,356,982

FLOAT VALVE

Edward H. East, Edinburg, Tex.; Florence Arnold East, independent executrix of said Edward H. East, deceased Application March 8, 1943, Serial No. 478,403

4 Claims. (Cl. 119—78)

This invention relates to float valves and more particularly to a mixing float valve particularly designed for use in connection with drinking troughs for live stock.

The object of the invention is to provide a float valve of simple and inexpensive construction by means of which soluble minerals or medicines, in the desired proportions, may be conducted to the drinking trough and mixed with the water therein to facilitate the administration of medicaments to all kinds of live stock.

A further object of the invention is to provide a float valve having dual inlets and a valve member for simultaneously cutting off or permitting the flow of fluid through both inlets.

A further object is to provide the valve member with a depending weighted portion to assist in holding said valve member to its seat over both inlets when the valve is in closed position and thus prevent the admission of an excessive amount of medicament to the water in the drinking trough.

A still further object of the invention is generally to improve this class of devices so as to increase their utility, durability and efficiency, as well as to reduce the cost of manufacture.

In the accompanying drawing:

Figure 1 is a vertical sectional view of a mixing float valve embodying the present invention and showing the same in position within a drinking trough.

Figure 2 is a top plan view of the valve.

Figure 3 is a transverse sectional view taken on the line 3—3 of Figure 2.

Figure 4 is a vertical sectional view taken on line 4—4 of Fig. 2.

Figure 5 is a detail transverse sectional view taken on the line 5—5 of Figure 4.

The improved mixing float valve forming the subject matter of the present invention is particularly designed for use in connection with drinking troughs for live stock and, by way of illustration, is shown applied to a drinking trough of standard construction in which the numeral 5 designates the body of the trough, 6 the water inlet pipe, and 7 the float valve.

Threaded on the upper end of the water intake pipe 6 is a nipple 8 provided with an inlet 9 and having its upper edge ground to a smooth surface to form a valve seat 10. Extending longitudinally of the intake pipe 6 at one side thereof and preferably rigidly secured thereto by spot welding 11, is an auxiliary intake pipe 12, the lower end of which leads to a tank or other receptacle containing suitable soluble minerals or medicaments adapted to be conducted through the pipe 12 to the water in the trough and mixed with said water for the administration of medicine to live stock in the treatment of certain diseases.

The upper end of the auxiliary intake pipe 12 is provided with an inlet 13 and the upper edge of said auxiliary intake pipe is provided with a valve seat 14 disposed in horizontal alinement with the valve seat 10. The nipple 8 is provided with an upwardly extended bifurcated arm 15 in which is pivotally mounted at 16, the adjacent portion of the stem of the float 7, the inner end of said stem being pivotally connected at 17 between upstanding ears 18 formed on a valve cap 19. Secured to the lower surface of the cap 19 is a substantially oval-shaped valve 20 of sufficient size to simultaneously close the inlets 9 and 13, and secured to the lower surface of said valve is a gasket 21 formed of leather or other suitable material, which contacts with the valve seats 10 and 14 so as to form a tight joint between the parts and prevent the admission of either water or medicament to the water in the drinking trough when the valve is in closed position.

Depending from the cap 19 is a threaded stem 22 which engages a correspondingly threaded opening in a substantially conical shaped weight 23 which weight not only serves to retain the valve 20 and gasket 21 in position on the cap 19, but also serves to assist in closing the valve and holding said valve in closed position. It will thus be seen that as the live stock drink the water in the trough 5, and the level of said water recedes, the float 7 will actuate the valve 20 to simultaneously uncover both of the inlets 9 and 13, thereby permitting additional water to enter the trough through the inlet 9 and, at the same time, soluble medicament in the desired proportions, through the inlet 13, which medicament will be mixed with the water in the trough by the action of the water entering the trough. As the water in the trough is replenished, the float 7 will rise and cause the valve 20 to automatically and simultaneously close both the inlet 9 and the inlet 13, and in which position, the valve 20 will be held closed by the action of the weight 23, thereby effectually preventing the admission of an overdose of medicine to the water in the drinking trough.

It will, of course, be understood that the valve may be made in different sizes and shapes and while it is particularly adapted for use in connection with drinking troughs, it will be understood that such devices may be used for mixing disinfectants or deodorants with water in any receptacle or wherever said device may be found desirable or necessary, without departing from the spirit of the invention.

Having thus described the invention, what is claimed is:

1. The combination with a liquid receiving trough, of an intake pipe extending within the trough and having its upper end provided with an inlet surrounded by a valve seat, an auxiliary pipe adapted to receive a medicament and having its upper end provided with an inlet surrounded by a valve seat disposed in horizontal alinement with the first mentioned valve seat, a float operating in the trough, a valve operatively connected with the float and movable to closed position for simultaneously closing the inlet of both pipes, and a weight carried by the valve and extending within the first intake pipe for holding the valve in closed position.

2. The combination with a liquid receiving trough, of a liquid intake pipe extending within the trough and having its upper end provided with an inlet surrounded by a valve seat, an auxiliary medicament receiving pipe secured to the first mentioned pipe and having its upper end provided with an inlet surrounded by a valve seat disposed in horizontal alinement with the first mentioned valve seat, a float, a valve operatively connected with the float and including a cap having a depending stem, a gasket secured to the lower face of the cap, and a weight secured to the stem and engaging the gasket, said valve being movable to closed position with the gasket simultaneously engaging both valve seats and covering said inlets.

3. The combination with a liquid receiving trough, of a liquid intake pipe extending within the trough and having its upper end provided with an inlet surrounded by a valve seat, a medicament receiving pipe secured to the outside of the liquid intake pipe and having its upper end provided with an inlet surrounded by a valve seat disposed in horizontal alinement with the first mentioned valve seat, a float within the trough, and a valve operatively connected with the float and provided with a gasket of sufficient size to cover the inlets of both pipes when said valve is in closed position.

4. The combination with a liquid receiving trough, of a liquid intake pipe, a nipple threaded on the intake pipe and having its upper end provided with an inlet and its upper edge smooth and constituting a valve seat, said nipple being provided with an upwardly extending bifurcated arm, a medicament receiving pipe secured to the intake pipe and having its upper end provided with an inlet surrounded by a valve seat disposed in horizontal alinement with the first mentioned valve seat, a valve including a cap having upstanding ears and provided with a depending threaded pin, a float, a rod connected with the float and having its intermediate portion pivotally mounted in the bifurcated arm and its inner end pivotally connected with said ears, a gasket secured to the lower face of the cap and adapted to simultaneously close the inlets of both pipes when the valve is in closed position, and a weight threaded on the pin and engaging the gasket for holding the gasket against the adjacent face of the cap.

EDWARD H. EAST.